United States Patent
Rolland et al.

[15] 3,640,730
[45] Feb. 8, 1972

[54] PROCESS FOR PREPARING DOUGH AND BATTERS, AND THE FLOUR AND FLOUR-BASED PRODUCTS

[72] Inventors: Jacques R. Rolland, Longueuil, Quebec; John Holme, Preville, Quebec, both of Canada

[73] Assignee: The Ogilvie Flow Mills Company, Limited, Montreal, Quebec, Canada

[22] Filed: July 7, 1969

[21] Appl. No.: 839,475

[52] U.S. Cl. .................................... 99/91, 99/92, 99/93
[51] Int. Cl. ...................... A21d 2/28, A21d 2/22, A21d 2/04
[58] Field of Search ............................... 99/93, 91, 232, 92

[56] References Cited

UNITED STATES PATENTS 3,208,855  9/1965  Enoch et al. .......................... 99/92 X
1,519,014  12/1924  Watson et al. ........................... 99/91
3,053,666  9/1962  Henika et al. ......................... 99/91 X Primary Examiner—Raymond N. Jones
Assistant Examiner—James R. Hoffman
Attorney—Christen & Sabol

[57] ABSTRACT

The adverse effects of chlorine upon the bread making properties of flour are ameliorated by incorporating therein a definite, selected amount of a sulfhydryl-containing-or-producing reducing substance, preferably cysteine hydrochloride. The flours so obtained, at chlorine levels of between about 150 p.p.m. and about 900 p.p.m. and a reducing substance content of between about 20 p.p.m. and 100 p.p.m., provide improved all-purpose flours which give good results in the contrasting applications of bread and cake making. Further advantageous effects on the quality of the baked product can be obtained by including defined amounts of ascorbic acid type additives and/or oxidizing agents such as bromate or iodate salts.

25 Claims, 5 Drawing Figures

3,640,730

PROCESS FOR PREPARING DOUGH AND BATTERS, AND THE FLOUR AND FLOUR-BASED PRODUCTS

INTRODUCTION

The invention relates broadly to flour-based products, and processes for using and making them. More particularly, it is concerned with improved all-purpose flours which are particularly suitable in a diversified range of applications both for domestic purposes and in commercial bakeries, and to processes for making them involving a chemical treatment of the flour and the subsequent incorporation in the flour, or dough derived therefrom, of particular classes of functional additives.

PRIOR ART

It is well known and accepted to those skilled in the art of flour milling and baking that the making of chemically aerated products such as cakes, cookies, pastries, and yeast-leavened products such as bread and rolls, are essentially dissimilar operations which demand, for optimum results, quite different performances from the flour base. It is for this reason that, in the baking trade, two different sorts of flour, sometimes referred to as pastry flour and bread flour, and differing in the wheat source and/or treatment to which the milled flour is subjected, are customarily used in each of these contrasting applications (cf. Yearbook of Agriculture, 1959, U.S. Department of Agriculture, p. 383).

Successful cake baking, though something of an art, is definitely dependent upon several controllable factors. An important factor is the sort of flour used in the recipe. In general, the protein of the flour is not particularly important for it is not the sole source of protein relied upon for successful cake baking. Rather, egg proteins constitute the main functional source of protein. On the other hand, the starch content of the flour is very important, for starch is relied upon to set the cake into the porous, spongy, fluffy structure much sought after and desired. For this reason, a soft wheat is normally used for cake-baking flours, for such a wheat gives a flour having a relatively high starch content (around 75 percent) and a relatively low gluten, i.e., flour protein, content (around 8 percent).

In the baking of yeast-leavened products, typically bread and rolls, the flour used is also very important, in this instance, not only for its starch content, but also for its protein content. Thus, the final structure of a yeast-leavened product always depends on the satisfactory development of a protein or gluten matrix, for this matrix is relied upon for gas retention throughout the preparation of the baked products. It is generally recognized that hard wheat flours are best suited for this type of bakery product, and soft wheat flours do not produce acceptable results in such bakery operations.

In the manufacture of flour intended for use in such yeast-leavened products, it is usual to treat the flour in such a way as to enhance the physical characteristics and gas retention properties of doughs subsequently made from these flours. These maturing or aging treatments accelerate or replace natural aging of flours, and they involve the addition of minor quantities of a suitable oxidizing agent. The oxidizing agents currently used for this purpose are primarily bromate salts, iodate salts, chlorine dioxide and azodicarbonamide. At one time, chlorine was widely used as a gaseous maturing agent (cf. Wheat: Chemistry and Technology, 1964, Vol. 3, American Association of Cereal Chemists Inc., p. 214) originally for bread flours because chlorine has two very desirable effects upon flour, in that it both bleaches and matures the flour. However, it was subsequently realized that chlorine treatment of hard wheat flours intended for yeast-leavened products (cf. Wheat: Chemistry and Technology, op. cit., p. 215) resulted in an adverse baking performance, because chlorine, being a powerful oxidizing agent, adversely affects the gluten, probably through overoxidation, at levels of chlorine needed to give adequate bleaching. The overoxidation of gluten is associated with a tight, inelastic film of poor extensibility and gas retention properties. In any event, the end result is a loaf having a nonuniform internal structure with a very ragged crust containing numerous tears, and a generally small loaf volume.

On the other hand, it is now widely recognized that a chlorine treatment of soft wheat flours intended for cake baking, i.e., a pastry flour, is very advantageous. It is well known and widely accepted that this chlorine treatment enables the mixes to carry a higher proportion of sugar and shortening, and increases the resistance of cakes to subsequent falling when baked. Cakes from chlorine bleached flours have a finer texture, smaller and more uniform cells, and generally more tender structures than cakes from unchlorinated flours. A review summarizing the role and advantages of chlorine as a bleaching agent in cake flours is given by Sollars in "The Bakers Digest," June 1961, pp. 48–53.

In summary, it is recognized today that cake baking and bread baking demand, for best and reproducible results, different flours and/or flour performances and, in particular, that chlorine-treated flours are advantageous in the former role but unsatisfactory in the latter. Accordingly, at the present time, chlorine when employed as a bleaching agent is usually confined to soft wheat flours intended for cake-baking applications.

In view of the manifest inconvenience and additional costs of having to select a particular flour with the desired baking application in mind, efforts have been made to provide flours adaptable to, and usable in, a varied range of baking applications. Indeed, many such flours are currently available under the designation all-purpose or family flours. Those all-purpose flours presently on the market, represent a compromise between the optimum flours for each possible bakery usage, notably between its suitability as a pastry flour and as a bread flour. Generally speaking, a typical all-purpose flour currently available would be made from hard wheat, and would be derived from the highest grade flour stream. Such a flour is very white, and normally receives treatments incorporating benzoyl peroxide along with very small quantities of one or a combination of maturing agents such as a bromate salt, chlorine dioxide, azodicarbonamide, and the like.

OBJECTIVES

A primary object of this invention is to provide improved all-purpose or family flours capable of giving good and highly acceptable results when employed in different applications, especially in the contrasting applications of cake and bread baking. Another object is to provide flour-based products which, when used in breadmaking, substantially decrease the time required for the proper fermentation of the dough, while yielding a bread of good color, flavor, volume and grain structure.

Further objects and features of the invention will appear from the following description in which preferred embodiments have been set forth in detail, and the accompanying drawings in which.

Figure 1:
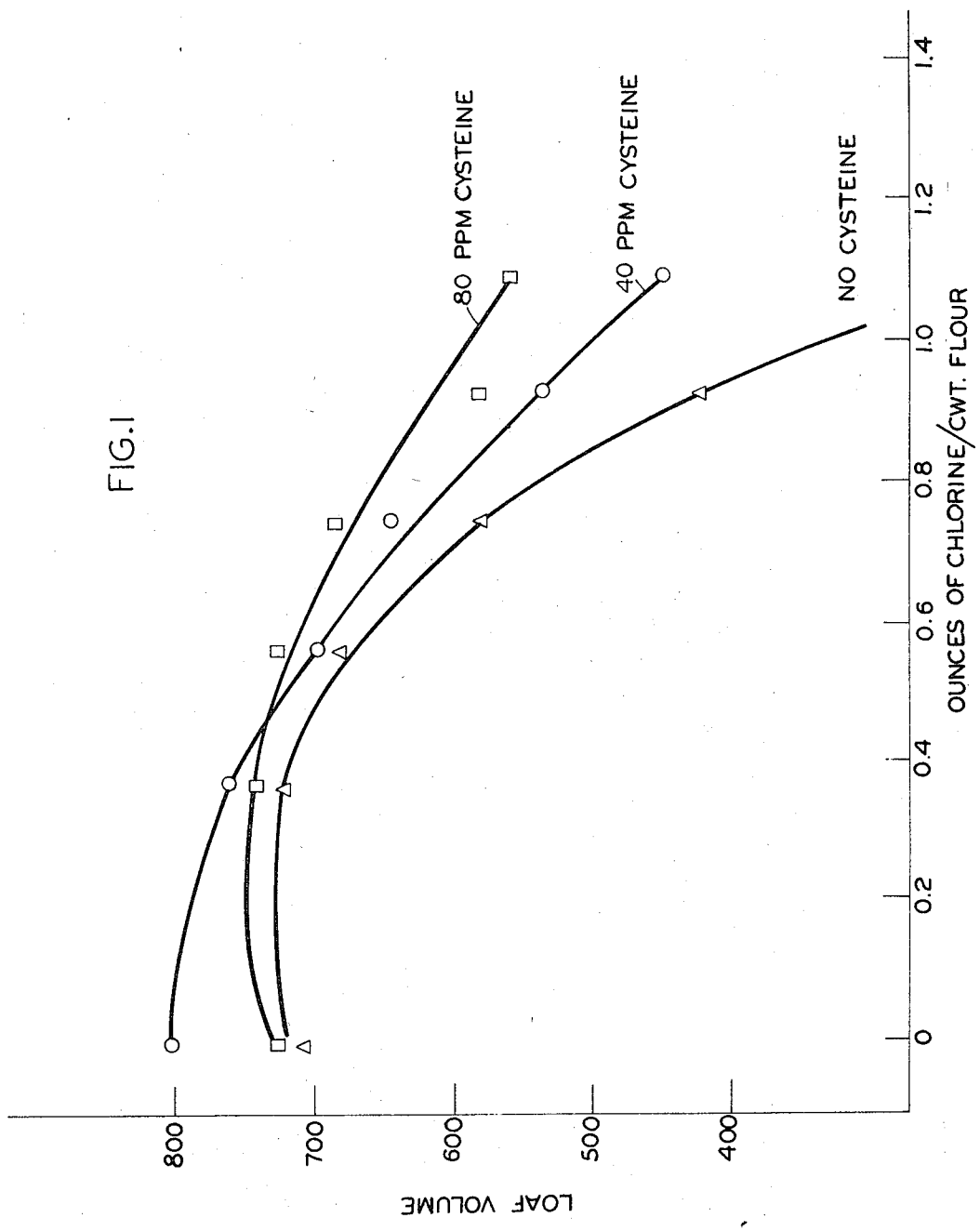
FIG. 1 is a graph showing several curves obtained by plotting loaf volume as a function of chlorine level at different functional additive contents.

These figures will be referred to in the detailed description.

STATEMENTS OF INVENTION

In accordance with this invention, it has now been found, and this finding forms the basis of the present invention, that the known and accepted adverse effects of chlorine on the breadmaking properties and performance of flour can, at worst, be substantially ameliorated and, at best, effectively eliminated, by the incorporation, in suitable amounts, of a specific class of functional additive. Moreover, this class of additive does not interfere with the beneficial, improving role of chlorine in cake baking. Accordingly, by combining together a chlorine treatment of flour at a specific range of chlorine levels with the subsequent addition, preferably to the flour itself but, if desired, to the dough derived therefrom, of a definite, selected amount of functional additive in the form of a reducing agent selected from the group consisting of sulfhydryl (SH)-containing and sulfhydryl-producing substances, an all-purpose flour is obtained which is capable of giving optimum results in a diversified range of applications both in the home and in commercial bakeries. In addition, we have also found that further improvements in the breadmaking characteristics of the chlorine-treated flour can be elicited, without detracting significantly from its good cakemaking characteristics, by the inclusion of other functional additives of the ascorbic acid type and/or edible oxidizing agent, for example, bromate or iodate salt type. Moreover, the presence of one or more of these additional functional additives can inhere with distinct advantages in bread processing, notably a reduction in the mixing speed requirements and a substantial reduction in the fermentation time.

DETAILED DESCRIPTION OF INVENTION

Flours which may be employed in the practice of this invention include any edible flour comprising proteins, starch and minerals. Typical of such flours are white flour, whole wheat flour, and the like which, when appropriate, can be blended to give the desired flour base.

The chlorine treatment to which the flour is subjected may be effected during or after milling, conveniently at milling, and prior to inclusion of the sulfhydryl-containing-or-producing reducing agents. It may be accomplished in any of the conventional ways using chlorine itself or Beta Chlora which is a mixture comprising 99.5 percent chlorine and 0.5 percent nitrosyl chloride and is readily available commercially. Thus, for example, the flour in the dry state may be exposed, in an enclosed container, to an appropriate amount of chlorine or the chlorine may be added to a moving stream of the flour during the milling operation. The level of chlorine attained by the treatment may vary substantially depending upon several factors such as the grade of the flour but, in all instances, it should be adequate to give the desired improvements in cake baking and, desirably also, to whiten or bleach the flour for this is an important consideration in breadmaking. It has been found that in practicing the invention both the above criteria are usually met, and useful results attained when the chlorine level is between about 150 p.p.m. and about 900 p.p.m. based on flour content. When the level falls below about 150 p.p.m. there is no significant improvement in cake quality, and above about 900 p.p.m. chlorine there is a marked deterioration in the quality of the bread products. Preferred chlorine levels are between about 350 p.p.m. and 700 p.p.m. but this varies within fairly broad limits depending on such factors as the strength of the flour, the product for which it is to be used and the baking procedure. The chlorine level is controlled both directly, through the actual amount of chlorine used in the treatment and, indirectly, by pH determination. Usually, the optimum pH, corresponding to the preferred chlorine range, falls between about 5.1 and about 5.5.

The sulfhydryl-containing-or-producing reducing substance may be an edible bisulfite, for example, sodium or potassium bisulfite, an edible sulfite, for example, sodium or potassium sulfite, cysteine in the form of a free base (L and D and DL cysteine) or edible salts thereof, glutathione, thioglycolic acid or edible salts thereof, for example, the calcium salt, or thiolated proteins. The preferred reducing substance is L-cysteine hydrochloride. All the foregoing substances are nontoxic and do not result in the formation of any toxic or otherwise objectionable byproduct with other constituents of the mix. They have no adverse or deleterious effects upon flavor, nutritive value or other essential properties of the final product. Small amounts of one or more of these reducing substances have been found to counteract the known bad effects of chlorine upon the quality and properties of bread and other yeast-leavened products without significantly detracting from cake quality. In practice, we find that between about 20 p.p.m. and about 100 p.p.m. of the reducing substance based on the flour content usually give good results but this varies depending, for instance, on chlorine level. Thus, generally speaking, high chlorine levels require a higher content of reducing substance. Preferred amounts are between about 50 p.p.m. and about 90 p.p.m. The reducing substance may be introduced into, and intimately blended with the flour, to the flour-based product, to the dough or, in the case of a continuous breadmaking process, to the brew, and it may be added separately or in association or conjunction with other additives or adjuvants. It may be added in the form of a powder or as solution solvent, say, water, and thoroughly blended in by agitation.

That these reducing substances should serve in the role of bread improvers in this way is wholly unexpected for it is quite contrary to generally accepted teaching concerning the behavior of these substances. Thus, the effect of these reducing substances, especially cysteine and glutathione upon the mixing time needed to properly develop a dough in conventional bread processes has been reported in the cereal literature. It is known that a reduction in mixing time is effected by these substances. It is also known (see, for instance, Holme & Spencer, Cereal Chemistry, Vol. 29, 1952, p. 251) that they usually reduce bread quality to an unacceptable level because of the poor internal structure of the baked bread. Accordingly, following prior teaching about the action of these substances, one would have anticipated that the presence of these reducing substances far from restoring bread quality would have further detracted therefrom.

The chemistry involved in obtaining the restoring effect on treating flour with chlorine followed by a reducing substance is not clearly understood. However, it is currently believed that chlorine treatment of flour results in an interaction between chlorine and, on the one hand, natural lipids of flour, and, on the other hand, water, resulting in the production of chlorates and hydrogen peroxide, both strong oxidizing materials. It is possible, then, that when a dough is made with chlorinated flour, these oxidizing agents would in turn oxidize some components of flour, namely sulfhydryl-containing molecules such as lipoic acid and glutathione, thereby functionally destroying them. The overoxidation which would result from the presence of these materials in excess of useful levels could explain the poor bread quality from chlorine-treated flours. On the basis of the foregoing hypothesis, the restorative effect of the reducing substances may derive from a twofold action. They may act upon the chlorine-water reaction products thereby tending to prevent overoxidation of the flour. Again, the deliberate inclusion of sulfhydryl-containing substances would effectively replace some or all of the components destroyed by the chlorine treatment. That the reducing substances have little, if any, adverse effects on cake quality may be attributable to the fact that the chlorinated lipids, which are considered to be important in cake baking, being relatively stable, are substantially unaffected and unaltered by the reducing substances. Whatever the validity of these theories, it is the case that the reducing substances effectively restore bread quality. It may also be significant that, in the practice of this invention, the reducing substances do not permit any marked reduction in mixing requirements which normally is associated with the presence of such substances.

Quite apart from the important role of the reducing substances in restoring bread quality, the combination of a chlorine treatment and reducing substance is found, in bread baking, to have an unexpected effect on the fermentation time requirement for a wide variety of flours. Even at relatively low chlorine and reducing substance levels, say, 200 p.p.m. of the former and 20 p.p.m. of the latter, the combination permits the fermentation time, for proper dough development, in a standard straight-dough procedure, to be reduced from 2 hours to 1 or even one-half hour.

Some of the advantages obtaining from the chlorine-reducing agent combinations are illustrated in and by the following examples.

In these, and other examples herein, the materials and procedures used were as described hereunder, except where otherwise stated.

FLOUR

The flour used was a patent flour from Canadian Hard Red Spring Wheat usually utilized as the basis of an all-purpose flour except that in this instance it was received in untreated condition. This flour had a protein content of 12.1 percent and an ash content of 0.38 percent as calculated on a 14 percent moisture basis.

CHLORINATION

Chlorination was accomplished in a glass vessel containing the flour. The flask was partially evacuated, and measured amounts of chlorine corresponding to the desired final chlorine level added. Chlorine reacted with, and was absorbed by, the flour almost instantaneously, as the flask was shaken. The chlorinated flour was then allowed to rest for 2 days in polyethylene bags after which the pH (which reflected accurately the chlorine level) of each flour sample was determined. It was then used for baking bread, cakes or other product, as appropriate.

REDUCING SUBSTANCE

The reducing substance used was cysteine hydrochloride as representative of the SH-containing reducing substances generally. In bread-baking procedures the cysteine was added to the dough, as one of the dough ingredients in solution in water. The material was added in solution in order to ensure accuracy when working with low levels of cysteine.

BREAD BAKING

A straight dough procedure with the fermentation period varied from 30 minutes to 2 hours was employed. The bread formula was a standard white bread recipe including 100 percent flour, 60 percent water, 3 percent sugar, 2 percent salt, 3 percent compressed yeast, 3 percent shortening, 0.3 percent malt syrup and 0.1 percent ammonium dihydrogen phosphate (all percentages on a weight basis).

The baking procedure involved mixing the dough ingredients in a Swanson-type mixer for 2 minutes, allowing the dough to ferment for various periods of time at 90° F., followed by makeup and panning, proofing to a specific height, and, finally, baking at 425° F. for 25 minutes.

CAKE BAKING

Three different cake-baking formulas and procedures were used for these tests. They are identified as A, B, C herein and are described below.

A.

| Formula Ingredient | Content (g.) |
| --- | --- |
| Flour | 230 |
| Sugar | 190 |
| Milk | 175 |
| Egg | 114 |
| Shortening | 95 |
| Salt | 3 |
| Baking Powder | 15 |
| Vanilla | 4 |

PROCEDURE

The flour, salt, baking powder and sugar, were stirred together in a large bowl electric mixer. Vanilla was added to the milk which, thereafter, was added to the dry ingredients along with the shortening. The ingredients were blended at No. 1 speed for 30 seconds; then mixed on No. 4 speed for 2 minutes, with frequent scraping of bowl sides. The eggs were added and the mixture beat for 1 minute longer on No. 4 speed. It was then poured into a greased and lined 8-inch square cake pan, and baked at 350° F. for 40 to 50 minutes.

B.

| Formula Ingredient | Content (g.) |
| --- | --- |
| Flour | 185 |
| Sugar | 190 |
| Milk | 175 |
| Egg | 114 |
| Shortening | 65 |
| Salt | 3 |
| Baking powder | 12.5 |
| Vanilla | 4 |

PROCEDURE

The dry ingredients were stirred together. Shortening and 115 g. milk were added and the mixture beat for 2 minutes. Sixty grams milk, eggs and vanilla were added and beat for 2 minutes. Batter was poured into a greased, lined, 8-inch square pan, and baked at 350° F. for 40 to 50 minutes.

C.

| Formula Ingredient | Content (g.) |
| --- | --- |
| Flour | 175 |
| Sugar | 175 |
| Skim milk powder | 14 |
| Salt | 4 |
| Starch | 4 |
| Leavening | 12.5 |
| Shortening | 37 |
| Egg | 57 |
| Water | 195 |

PROCEDURE

All of the ingredients, except 80 g. water, were mixed in an electric mixer, and then beat for 2 minutes at medium speed. The remaining 80 g. water was added and the mixture beat for 2 minutes, and baked at 350° F. for 40 minutes in 8-inch square pan.

PROPERTIES

A. Bread Baking

A good indication of the bread-baking properties of a flour which are related to dough development and gas retention is the volume of a loaf of bread. Thus, a large volume is indicative of better development, maturity and overall bread-baking properties. Volume is measured by the standard rapeseed displacement method conducted 1 hour after baking. In addition, the loaves are judged on the morning of the following day. Both external and internal characteristics are observed and noted.

B. Cake Baking

Cake properties were determined by measuring the amount of shrinkage (center and edge height) which follows cooling of the cake after baking, and also by visual inspection of internal and external characteristics.

EXAMPLE 1

This example illustrates the adverse effects of chlorine addition on the bread-baking properties of flour. The baking results observed when chlorine was added in incremental amounts to the flour and a 2-hour fermentation employed in the standard baking procedure are listed in the Table I which follows.

TABLE I

| Chlorine Level | | Loaf Volume | Visual Characteristics |
|---|---|---|---|
| p.p.m. | pH | cc | |
| 0 | 5.8 | 715 | Very fine grain and texture |
| 222 | 5.6 | 725 | Fine grain and texture |
| 335 | 5.5 | 685 | Overmature, fine grain, crust tears |
| 450 | 5.4 | 585 | Overmature, coarse grain, crust tears |
| 560 | 5.3 | 425 | Overmature, coarse grain, crust tears |
| 670 | 5.1 | 400 | Very coarse grain, thick cell walls, crust tears |

Figure 2:
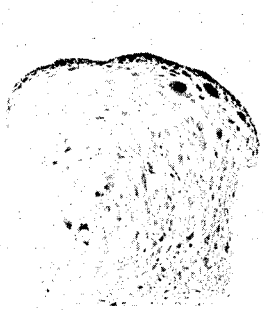
FIG. 2 is a photograph without magnification showing, in cross section, a loaf derived from a chlorine-treated flour.

These results, indicating that chlorine had a generally deleterious effect on the bread-baking properties of flour, verify prior art teaching. Increasing levels of chlorine were very detrimental, yielding loaves of greatly reduced volume. The photograph reproduced as FIG. 2 of the accompanying drawings shows a cross section of such a loaf. On referring to this figure, the coarse texture and open grain which are characteristic of the chlorine treatment are clearly seen.

EXAMPLE 2

This example demonstrates and verifies the restorative effect on bread-baking properties of cysteine addition to chlorinated flour. The baking results observed when incremental amounts of cysteine were added to each dough made with a particular level of chlorinated flour are listed in the following Table II. The fermentation period was again 2 hours.

TABLE II

| Chlorine level | | Cysteine level (p.p.m.) | | | | | |
|---|---|---|---|---|---|---|---|
| P.p.m. | pH | 0 | 20 | 40 | 60 | 80 | 100 |
| 0 | 5.8 | 715 | 775 | 805 | 750 | 725 | 615 |
| 222 | 5.6 | 725 | 745 | 760 | 870 | 745 | 590 |
| 335 | 5.5 | 685 | 670 | 700 | 750 | 725 | 590 |
| 450 | 5.4 | 585 | 630 | 645 | 700 | 685 | 595 |
| 560 | 5.3 | 425 | 490 | 535 | 630 | 580 | 575 |
| 785 | 5.1 | 400 | 410 | 450 | 500 | 560 | 530 |

Figure 3:
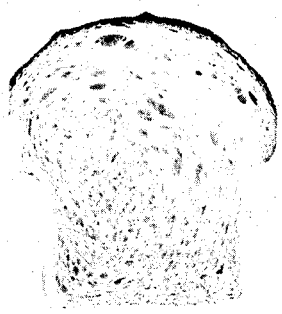
FIGS. 3 and 4 are photographs, without magnification, showing, in cross section, loaves derived from the improved all-purpose flours of this invention.

These results indicate that, with this particular procedure, cysteine addition in the range of 20 to 80 p.p.m., depending on, and varying with chlorine level, had a beneficial effect on the baking performance of chlorinated flour, increasing the dough development and gas retention properties, as reflected in loaf volume, in bread baking. In this range, and at all five chlorine levels, the bread volume was normally satisfactory for commercial purposes. However, as the results indicate, a limit is reached where at a high chlorine level, cysteine addition does not provide full recovery. The trends apparent from these results are shown in the graph reproduced as FIG. 1 of the accompanying drawings. In particular, the graph indicates how higher levels of chlorine received more benefits from cysteine addition in terms of loaf volume. From the photograph reproduced as FIG. 3 of the accompanying drawings, the fine texture and even grain of a typical loaf obtained in this example can be seen.

EXAMPLE 3

Using the standard formula, the bread-baking procedure was repeated with incremental amounts of chlorine up to 900

TABLE III

| Chlorine level | | Cysteine level (p.p.m.) | | | | |
|---|---|---|---|---|---|---|
| p.p.m. | pH | 0 | 20 | 40 | 60 | 80 |
| 3 5 | 5.45 | 765 | 840 | 855 | 850 | 825 |
| 450 | 5.40 | 705 | 785 | 800 | 810 | 820 |
| 560 | 5. 0 | 725 | 795 | 8 5 | 795 | 815 |
| 670 | 5.15 | 5 5 | 650 | 660 | 645 | 810 |
| 785 | 5.10 | 545 | 685 | 690 | 615 | 685 |
| 900 | 5.00 | 5 5 | 565 | 690 | 735 | 760 | p.p.m. and cysteine, (0 to 80 p.p.m.), but with a bulk fermentation time of 1 hour. The baking results obtained are listed in Table III.

EXAMPLE 4

Using the standard formula, the bread-baking procedure was repeated again with incremental amounts of chlorine up to 900 p.p.m. and cysteine (0 to 80 p.p.m.), but with a bulk fermentation time of only one-half hour. The baking results obtained are listed in Table IV which follows.

TABLE IV

| Chlorine level | | Cysteine level | | | | |
|---|---|---|---|---|---|---|
| p.p.m. | pH | 0 | 20 | 40 | 60 | 80 |
| 3 5 | 5.45 | 7 0 | 850 | 855 | 890 | 820 |
| 450 | 5.40 | 610 | 765 | 790 | 855 | 820 |
| 560 | 5. 0 | 720 | 8 5 | 8 5 | 805 | 805 |
| 670 | 5.15 | 565 | 6 5 | 675 | 625 | 700 |
| 786 | 5.10 | 575 | 6 5 | 650 | 685 | 725 |
| 900 | 5.00 | 5 5 | 605 | 650 | 670 | 715 |

The results reported in Table III and IV for the last two examples are illustrated graphically in FIG. 1 of the accompanying drawings which also affords a comparison with the results of Example 2 (2-hour bulk fermentation). It can be observed from the graph that chlorine/cysteine combinations permit a marked reduction in fermentation time without any adverse effects upon bread quality. Indeed, the converse is the case, for the results indicate that for a comparative chlorine/cysteine content a one-half or 1 hour fermentation period gave better quality bread than a 2-hour period. Accordingly, in practising this aspect of the invention, it is desirable to operate with reduced bulk fermentation times of one-half or 1 hour, which is advantageous.

EXAMPLE 5

This example illustrates the good cake-baking properties of a chlorine-treated flour. Procedures A, B and C described at a previous passage herein were employed, and incremental amounts of chlorine used. The cake-baking properties obtained for a given procedure, and specific chlorine level are listed in Tables V to VII which follow.

TABLE V

| Procedure A Chlorine Level | | Cake Shrinkage | | Remarks |
|---|---|---|---|---|
| p.p.m. | pH | Center | Side | |
| | | | (cm.) | |
| 0 | 5.8 | 2.8 | 1.0 | Dip in center, compact and wet, uneatable. |
| 450 | 5.4 | 2.6 | 0.7 | Dip in center, compact, rather doughy. |
| 670 | 5.15 | 1.9 | 1.0 | Little dip, slightly compact, moderately fluffy. |
| 785 | 5.10 | 1.6 | 0.5 | Small dome, fluffy. |
| 900 | 5.00 | 1.4 | 0.4 | Even top, fluffy. |

TABLE VI

| Procedure B Chlorine Level | | Cake Shrinkage | | Remarks |
|---|---|---|---|---|
| p.p.m. | pH | Center | Side | |
| | | (cm.) | | |
| 0 | 5.8 | 2.6 | 1.1 | Wet, compact, doughy and pasty. Dip in center. |
| 222 | 5.6 | 2.0 | 0.7 | Slightly compact. Flat on top. |
| 450 | 5.4 | 1.8 | 0.7 | Nearly flat on top, slightly compact. |

TABLE VII

Procedure C

| Chlorine Level | | Cake Shrinkage | | Remarks |
|---|---|---|---|---|
| p.p.m. | pH | Center (cm.) | Side | |
| 0 | 5.8 | 2.3 | 0.7 | Dip on one side, wet and tight, compact at bottom, dry. |
| 450 | 5.4 | 0.8 | 0.5 | Even top, fine grain, fluffy. |
| 785 | 5.1 | 0.8 | 0.3 | Small dome, fine grain, fluffy. |
| 785 | 5.1 | 0.6 | 0.3 | Dome, very slightly compact but fluffy texture. |

The results presented in the foregoing tables indicate and verify that gradual increases in chlorine addition to flour are associated with a significant improvement to cake characteristics, and that even a small amount of chlorine is better than none at all.

EXAMPLE 6

In this example, cysteine is incorporated in chlorinated flours at levels of chlorine and cysteine compatible with good bread-baking performance in order to demonstrate that cysteine, within the selected range, does not adversely affect the improving action of chlorine in cake baking. The cake baking properties obtained are noted in Table VIII which follows. In each instance, the flour contained 70 p.p.m. cysteine which often is found to be about optimum for bread-baking performance.

TABLE VIII

| Chlorine Level | | Cake Shrinkage | | Remarks |
|---|---|---|---|---|
| p.p.m. | pH | Center (cm.) | Side | |
| 0 | 5.8 | 2.0 | 0.5 | Dip in center, compact. |
| 450 | 5.4 | 1.3 | 0.5 | Flat top, fine, fluffy. |
| 660 | 5.1 | 1.1 | 0.3 | Slight dome, very fine, fluffy. |

The results show that cysteine does not interfere with the improving action of chlorine in cake baking.

While a reducing substance, such as cysteine, by itself, as verified by the foregoing results, is effective in restoring bread quality and properties, further substantial improvements in these properties (without adverse effects on cake properties) can be attained, in appropriate circumstances, by including, as functional additives, suitably small amounts of the following substances:

i. Ascorbic acid or ascorbic-acid-type additives.
ii. Mild oxidizing agents of the bromate type such as bromate salts, iodate salts, persulfates, and azodicarbonamide.
iii. Mixtures containing two or more of these functional additives.

These additives may be incorporated along with, or subsequently to, the cysteine or other like reducing substance, and in any convenient way, say, as a powder or, as when incorporated in the dough, in solution in an appropriate solvent.

The following examples illustrate and further describe this aspect of the invention.

EXAMPLE 7

In this example, formulas were used in which increasing levels of chlorine were combined with increasing levels of cysteine (25 to 100 p.p.m.), and ascorbic acid was incorporated in incremental amounts (0 to 100 p.p.m.), to the different chlorine-cysteine combinations. Four series of baking trials using the foregoing procedure were conducted, except that each involved a different fermentation period, which was conducted over 2, 1½, 1 and one-half hour respectively. The baking results obtained for the different fermentation periods are summarized in Tables IX to XII which follow.

TABLE IX.—2 HOUR FERMENTATION

| Chlorine level | | Cysteine level, | Ascorbic acid level | | | |
|---|---|---|---|---|---|---|
| p.p.m. | pH | p.p.m. | 0 | 25 | 50 | 100 |
| 108 | 5.7 | 25 | 795 | 830 | 855 | 985 |
| 222 | 5.6 | 40 | 760 | 865 | 870 | 910 |
| 335 | 5.5 | 55 | 750 | 700 | 805 | 880 |
| 450 | 5.4 | 70 | 700 | 735 | 800 | 815 |
| 560 | 5.3 | 85 | 580 | 600 | 745 | 785 |
| 660 | 5.1 | 100 | 530 | 570 | 730 | 745 |

Figure 4:
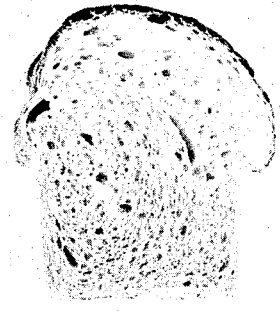

These results clearly indicate a beneficial effect of ascorbic acid in this system, though even the ascorbic acid could not fully counteract the markedly adverse effects of very high chlorine levels. It is significant that these improving effects were obtained notwithstanding the 2-hour fermentation which could have been expected to nullify the ascorbic acid action. The photograph reproduced as FIG. 4, shows the fine uniform texture and even grain of a typical loaf obtained from this example.

TABLE X.—1½ HOUR FERMENTATION

| Chlorine level | | Cysteine level, | Ascorbic acid level | | | |
|---|---|---|---|---|---|---|
| P.p.m. | pH | p.p.m. | 25 | 50 | 75 | 100 |
| 108 | 5.7 | 25 | 895 | 930 | 980 | 925 |
| 222 | 5.6 | 40 | 980 | 920 | 975 | 965 |
| 3.5 | 5.5 | 55 | 885 | 890 | 890 | 855 |
| 450 | 5.4 | 70 | 890 | 860 | 885 | 860 |
| 560 | 5.3 | 85 | 795 | 810 | 875 | 810 |
| 670 | 5.1 | 100 | 650 | 685 | 755 | 770 |

TABLE XI.—1 HOUR FERMENTATION

| Chlorine level | | Cysteine level, | Ascorbic acid level | | | |
|---|---|---|---|---|---|---|
| P.p.m. | pH | p.p.m. | 0 | 25 | 50 | 100 |
| 0 | 5.80 | 0 | 855 | 910 | 880 | 915 |
| 3?5 | 5.45 | 50 | 815 | 825 | 795 | 745 |
| 450 | 5.40 | 60 | 810 | 800 | 765 | 745 |
| 560 | 5.30 | 60 | 790 | 785 | 750 | 760 |
| 670 | 5.15 | 75 | 785 | 770 | 715 | 787 |
| 785 | 5.10 | 75 | 705 | 660 | 640 | 655 |
| 900 | 5.00 | 90 | 725 | 650 | 640 | 6 5 |

TABLE XII.—½ HOUR FERMENTATION

| Chlorine level | | Cysteine level, | Ascorbic acid level | | | |
|---|---|---|---|---|---|---|
| P.p.m. | pH | p.p.m. | 0 | 25 | 50 | 100 |
| 0 | 5.80 | 0 | 780 | 740 | 865 | 865 |
| 3?5 | 5.45 | 50 | 805 | 800 | 815 | 810 |
| 450 | 5.40 | 60 | 775 | 790 | 800 | 770 |
| 560 | 5.0 | 60 | 790 | 770 | 775 | 745 |
| 670 | 5.15 | 75 | 780 | 805 | 785 | 7 5 |
| 785 | 5.10 | 75 | 700 | 710 | 655 | 605 |
| 900 | 5.00 | 90 | 720 | 680 | 655 | 575 |

Referring to the results reported in Tables X to XII, the improving effect of ascorbic acid added to chlorine-cysteine treated flours was still noticeable in a baking process involving 1½ hour of fermentation. As a rule, however, it would seem that high levels of ascorbic acid were more effective in improving highly chlorinated flours. As the fermentation time was reduced, ascorbic acid became less effective and, in some instances, was actually detrimental to bread quality when the fermentation time was reduced to 1 hour or, more especially, one-half hour. The data presented show that ascorbic acid is an improving additive for chlorinated flours containing cysteine when the conventional (or long time) fermentation periods are employed. However, the indications are that in the practice of this invention using short-time fermentation processes, ascorbic acid is not a desirable functional additive. These results indicate that ascorbic acid does not function in this process as an oxidant, because such substances, for example, bromate and iodate salts, are known to give good results in short time fermentation processes. Evidence is available which suggests that rather it functions as an antioxidant.

EXAMPLE 8

In this example, formulas were used in which increasing levels of chlorine were combined with increasing levels of cysteine (25 to 85 p.p.m.), and bromate was incorporated in the fixed amount of 20 p.p.m. to the different chlorine-cysteine combinations. The fermentation period was fixed at one-half hour. The baking results obtained are summarized in Table XIII which follows.

TABLE XIII

| Chlorine Level | | Cysteine Level | Bromate Level | Loaf Volume |
|---|---|---|---|---|
| p.p.m. | pH | p.p.m. | p.p.m. | cc. |
| 108 | 5.7 | 25 | 20 | 960 |
| 222 | 5.6 | 40 | 20 | 990 |
| 335 | 5.5 | 55 | 20 | 940 |
| 450 | 5.4 | 70 | 20 | 925 |
| 560 | 5.3 | 85 | 20 | 800 |

These results, when compared with those of Table XII, indicate a beneficial effect of bromate at all chlorine levels, notwithstanding the fact that a short fermentation period of only one-half hour was involved. Again, this would indicate that bromate and ascorbic acid function quite differently, in the chlorine-cysteine systems. Cross sections of typical loaves obtained from this example have a fine uniform texture and even grain.

When ascorbic acid or ascorbic-acid-type additives are present, they may be included in an amount of between about 20 and about 100 p.p.m. based on flour weight. Desirably, the use of ascorbic acid is confined to conventional (long time) fermentation processes.

When bromates or like functional additives are present, they may be included in an amount of between about 10 and about 50 p.p.m. based on the flour weight. Desirably, the use of bromates is confined to short time fermentation processes.

The preferred ranges of the two sorts of additives are in most cases within the following limits:

| Ascorbic acid | 40 to 80 p.p.m. |
|---|---|
| Bromate salts | 15 to 30 p.p.m. |

EXAMPLE 9

This Example illustrates the application of the improved all-purpose flours, and dry mixes containing same, in the preparation of home-baked bread and cakes by standard procedures.

A. BREAD BAKING—STANDARD WHITE BREAD

| 1 pkg. active dry yeast | 1 tbsp. shortening |
|---|---|
| ½ cup warm water | 2 teaspoons salt |
| 1 teaspoon sugar | ⅔ cup water |
| ¾ cup milk | 5 cups flour** |
| ⅛ cup sugar | |

**The flour was a patent hard wheat flour treated with ⅔ oz. chlorine per cwt. (400 p.p.m.), which whitened it, blended with 75 p.p.m. cysteine hydrochloride and 50 p.p.m. ascorbic acid.

PROCEDURE

Sprinkle the yeast in one-half cup lukewarm water with 1 teaspoon sugar; let stand 10 minutes and stir. Scald milk, add sugar, shortening and salt. Stir until shortening melts, add water and cool to lukewarm. Add yeast to cooled milk mixture. Stir in 4 cups of flour and beat with a spoon until almost smooth. Add remaining flour gradually, mixing it in thoroughly and using just enough flour to prevent sticking to either the board or the hands. Turn dough out on lightly floured board and knead it until smooth and satiny. Shape into a smooth ball and place in a greased bowl, turn dough over in bowl to grease surface. Cover, and let rise in a warm place (80°–85° F.) until double in bulk (about 1 hour). Punch down, let rise again until double in bulk (three-fourths hour). Punch down again and turn out on a lightly floured board. Divide into two equal portions and mold into loaves. Place in greased 8½ inch × 4½ inch × 2½ inch loaf pans. Cover and let rise in a warm place about 1 hour. Bake at 400° F. 30 to 40 minutes.

B. CAKE BAKING

The recipe and procedure were that given for Procedure A hereinbefore using the same flour as for the bread.

Figure 5:
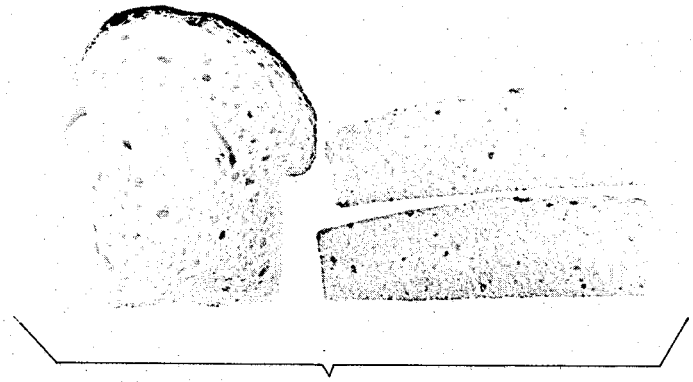
FIG. 5 is a photograph, without magnification, showing, side by side, cross sections of a loaf and two cakes derived from the same improved all-purpose flour of this invention.

The bread so obtained was of good appearance, structure and eating qualities with a specific volume, a measure of the "lightness" of the bread, of 4.5 cc./gm., which is good. The cake obtained was also of pleasing appearance with a gentle dome. It was fluffy in texture with good eating qualities. For comparative purposes, the same procedures were followed with the same bread and cake recipes except that the flour was a standard, commercially available all-purpose flour without the functional additives cysteine and ascorbic acid and unchlorinated. The benefits resulting from the chlorination and the presence of functional additives were clearly demonstrated by comparing cross sections of bread and cakes made from the novel, improved all-purpose flour of this example, and the commercially available all-purpose flour. The bread from the improved flour had a superior volume, and a more uniform and fine grain. The cake from the improved flour was dome-shaped and had a fine texture while the other cake was flat topped and had a doughy pasty texture. The eating qualities of the cake obtained from our novel all-purpose flour were superior to the other cake. FIG. 5 shows cross sections of the bread and cakes derived from the improved all-purpose flour by the procedure of this example.

The improved all-purpose flours of this invention may be employed in baking using any of the known procedures. Thus, instead of the straight dough procedure utilized in some of the foregoing examples, bread or some similar yeast-leavened product may be made from the all-purpose flours using, for instance, a sponge dough or a continuous, for example, Amflow or Do-Maker, procedure or the Chorleywood Bread Process. In the case of the Amflow and Do-Maker processes, the reducing substance and other functional additives(s), if any, are conveniently introduced, in solution, into the liquid preferment or brew and, using the Chorleywood Bread Process, they are conveniently introduced prior to mixing in the high-speed mixer. Also, the improved all-purpose flours may be used in making products other than bread and cakes. Rolls, pastries, cookies, doughnuts and pie shell casings are examples of other products that have been baked, with consistently good results, using these flours.

What is claimed is:

1. An improved all-purpose flour, said flour having been treated with chlorine to a level of between about 150 and about 900 p.p.m., based on the flour weight and containing, as a functional additive intimately blended therewith, between about 20 and about 100 p.p.m., based on the flour weight, of a substance selected from the group consisting of sulfhydryl-containing or sulfhydryl-producing reducing substances.

2. An improved all-purpose flour, said flour having been treated with chlorine to a level of between about 150 and about 900 p.p.m., based on the flour weight and, as functional additives intimately blended therewith, between about 20 and about 100 p.p.m., based on the flour weight, of a substance selected from the group consisting of sulfhydryl-containing and sulfhydryl-producing reducing substances, along with between about 20 and about 100 p.p.m., based on the flour weight, of ascorbic acid or an ascorbic acid type substance.

3. An improved all-purpose flour, said flour having been treated with chlorine to a level of between about 150 and about 900 p.p.m., based on the flour weight and, as functional additives intimately blended therewith, between about 20 and about 100 p.p.m., based on the flour weight, of a substance selected from the group consisting of sulfhydryl-containing and sulfhydryl-producing reducing substances, along with between about 10 and about 50 p.p.m., based on the flour weight, of a mild oxidizing agent.

4. An improved all-purpose flour as claimed in claim 3 wherein said mild oxidizing agent is a bromate salt or an iodate salt.

5. An improved all-purpose flour, said flour having been treated with chlorine to a level of between about 350 and about 700 p.p.m., based on the flour weight and containing, intimately blended therewith, between about 50 and about 90 p.p.m., based on the flour weight, of a substance selected from the group consisting of sulfhydryl-containing and sulfhydryl-producing reducing substances.

6. The improved all-purpose flour of claim 5, wherein the reducing substance is cysteine hydrochloride.

7. An improved all-purpose flour as claimed in claim 6 which also contains, intimately blended therewith, between about 20 and about 100 p.p.m., based on the flour weight, of ascorbic acid or an ascorbic-acid-type substance.

8. An improved all-purpose flour as claimed in claim 6 which also contains, intimately blended therewith, between about 40 and about 80 p.p.m., based on the flour weight, of ascorbic acid or an ascorbic-acid-type substance.

9. An improved all-purpose flour as claimed in claim 6 which also contains, intimately blended therewith, between about 10 and about 50 p.p.m., based on the flour weight, of a mild oxidizing agent.

10. An improved all-purpose flour as claimed in claim 9 wherein said mild oxidizing agent is a bromate salt or an iodate salt.

11. An improved all-purpose flour as claimed in claim 5 which also contains, intimately blended therewith, between about 15 and about 30 p.p.m., based on the flour weight, of a mild oxidizing agent.

12. An improved all-purpose flour as claimed in claim 5 which also contains, intimately blended therewith, between about 20 and about 100 p.p.m., based on the flour weight, of ascorbic acid or an ascorbic-acid-type substance.

13. An improved all-purpose flour as claimed in claim 5 which also contains, intimately blended therewith, between about 10 and about 50 p.p.m., based on the flour weight, of a mild oxidizing agent.

14. A method of improving all-purpose flours which comprises treating a flour with chlorine until the chlorine content is between about 150 and about 900 p.p.m. and thereafter, intimately blending with the chlorinated flour, between about 20 and about 100 p.p.m., based on the flour weight, of a functional additive selected from the group consisting of sulfhydryl-containing and sulfhydryl-producing reducing substances.

15. The method of claim 14, wherein between about 20 and about 100 p.p.m., based on the flour weight, of ascorbic acid or an ascorbic-acid-type additive are also intimately blended with the chlorinated flour along with, or subsequently to, the reducing substance.

16. A method as claimed in claim 14 wherein between about 10 and about 50 p.p.m., based on the flour weight, of a mild oxidizing agent are also intimately blended with the chlorinated flour along with, or subsequently to, the reducing substance.

17. A method as described in claim 16 wherein said mild oxidizing agent is a bromate or an iodate salt.

18. A dough suitable for baking into bread or like product composed principally of flour, water, sugar, salt, yeast and shortening wherein the flour is chlorinated to a chlorine content of between about 150 and about 900 p.p.m., based on the flour weight and incorporated therein, is between about 20 and about 100 p.p.m., based on the flour weight, of a functional additive selected from the group consisting of sulfhydryl-containing and sulfhydryl-producing reducing substances.

19. A dough as claimed in claim 18, additionally coating between about 20 and about 100 p.p.m., based on the flour weight, of ascorbic acid or an ascorbic-acid-type additive.

20. A dough as claimed in claim 18 which additionally contains between about 10 and about 50 p.p.m., based on the flour weight, of a mild oxidizing agent such as a bromate or iodate salt.

21. A dough as claimed in claim 20 wherein said mild oxidizing agent is a bromate or an iodate salt.

22. A cake batter composed principally of flour, sugar, milk, eggs, shortening, and baking powder wherein the flour is chlorinated to a chlorine content of between about 150 and about 900 p.p.m., based on the flour weight and incorporated therein, is between about 20 and about 100 p.p.m., based on the flour weight, of a functional additive selected from the group consisting of sulfhydryl-containing and sulfhydryl-producing reducing substances.

23. A cake batter as claimed in claim 22, additionally containing between about 20 and about 100 p.p.m., based on the flour weight, of ascorbic acid or an ascorbic-acid-type additive.

24. A cake batter as claimed in claim 22 which additionally contains between about 10 and about 50 p.p.m., based on the flour weight, of a mild oxidizing agent.

25. A cake batter as claimed in claim 24 wherein said mild oxidizing agent is a bromate or an iodate salt.

* * * * *